(12) United States Patent
Checketts

(10) Patent No.: US 10,105,610 B2
(45) Date of Patent: Oct. 23, 2018

(54) AMUSEMENT RIDE HARNESS APPARATUS, SYSTEM, AND METHOD

(71) Applicant: Stanley J. Checketts, Providence, UT (US)

(72) Inventor: Stanley J. Checketts, Providence, UT (US)

(*) Notice: Subject to any disclaimer, the term of this patent is extended or adjusted under 35 U.S.C. 154(b) by 17 days.

(21) Appl. No.: 15/487,285

(22) Filed: Apr. 13, 2017

(65) Prior Publication Data

US 2017/0296934 A1   Oct. 19, 2017

Related U.S. Application Data

(60) Provisional application No. 62/322,126, filed on Apr. 13, 2016.

(51) Int. Cl.
*B60R 22/02* (2006.01)
*A63G 31/00* (2006.01)
*A63G 7/00* (2006.01)

(52) U.S. Cl.
CPC .............. *A63G 31/00* (2013.01); *A63G 7/00* (2013.01)

(58) Field of Classification Search
CPC .......... B60N 2/24; B60N 2/283; B60N 2/286; B60N 2/688; B60N 2/2812; B60N 2/2872; B60N 2/4879; B60R 22/02; B60R 22/18; B60R 22/205; B60R 2021/022; B60R 2022/1818; A63G 7/00; A63G 31/00
USPC .... 472/2, 43–45, 59–60, 130, 135; 297/275, 297/464, 468–469, 483–486
See application file for complete search history.

(56) References Cited

U.S. PATENT DOCUMENTS

| | | | | |
|---|---|---|---|---|
| 3,169,036 | A | * | 2/1965 | Spooner ................. B60N 2/283 297/256 |
| 4,422,668 | A | * | 12/1983 | Thill ....................... B60R 22/06 280/804 |
| 4,846,498 | A | * | 7/1989 | Fohl ...................... B60R 22/205 280/801.2 |

* cited by examiner

*Primary Examiner* — Kien Nguyen
(74) *Attorney, Agent, or Firm* — Kunzler, PC

(57) ABSTRACT

Disclosed herein is a harness apparatus for an amusement ride that includes an elongate shaft fixedly secured at two attachment points to a passenger carriage, a fitting coupled to the elongate shaft, a harness attachment coupled to the fitting, and a harness. The fitting is freely movable along the elongate shaft between the two attachment points. The harness includes a first end and a second end. The first end of the harness is fixedly coupled to the harness attachment to secure a passenger in the amusement ride and the second end is fixedly secured to the passenger carriage.

18 Claims, 4 Drawing Sheets

AMUSEMENT RIDE HARNESS APPARATUS, SYSTEM, AND METHOD

CROSS-REFERENCE TO RELATED APPLICATION

This application claims the benefit of U.S. Provisional Patent Application No. 62/322,126, filed on Apr. 13, 2016, which is incorporated herein by reference.

FIELD

The present disclosure relates to amusement rides, and more particularly relates to harness systems for amusement rides.

BACKGROUND

Amusement rides are entertaining and provide exciting thrills to passengers. Safety considerations often limit the size requirements of a passenger to a small window of sizes that exclude larger and/or smaller passengers from enjoying an amusement ride. Adjustable harness systems are fraught with safety complications that limit the adjustment of harness systems to fit a particularly small or particularly large passenger.

In addition, safety guidelines often restrict movement of passengers that reduce the excitement that the amusement ride is designed to produce. For conventional amusement rides, a passenger is secured to a seat with little movement allowed between the passenger and the carriage of the amusement ride.

It is difficult to allow freedom of movement of a passenger while ensuring the passengers safety on the amusement ride. Once secured, conventional harness systems are restricted from moving relative to the amusement ride in order to provide adequate safety for the passengers.

SUMMARY

The subject matter of the present application has been developed in response to the present state of the art, and in particular, in response to the shortcomings of harness systems for amusement rides that have not yet been fully solved by currently available techniques. Accordingly, the subject matter of the present application has been developed to provide a harness system for amusement rides that overcomes at least some of the above-discussed shortcomings of prior art techniques.

The present disclosure relates to a harness apparatus for an amusement ride that includes an elongate shaft fixedly secured at two attachment points to a passenger carriage, a fitting coupled to the elongate shaft, a harness attachment coupled to the fitting, and a harness. The fitting is freely movable along the elongate shaft between the two attachment points. The harness includes a first end and a second end. The first end of the harness is fixedly coupled to the harness attachment to secure a passenger in the amusement ride and the second end is fixedly secured to the passenger carriage.

In one embodiment, the fitting is resistively slidable along the elongate shaft.

In one embodiment, the fitting is freely movable along the elongate shaft during operation of the amusement ride.

In one embodiment, the harness apparatus for an amusement ride includes a biasing element configured to bias the fitting in a direction along the elongate shaft. In one implementation, the biasing element configured to bias the fitting in a direction along the elongate shaft towards a seat of the passenger carriage.

In one embodiment, a length of the harness is lockable such that the length of the harness between the harness attachment and the second end is fixed.

In one embodiment, the attachment points are adjustable along a length of the elongate shaft to reduce or elongate the free motion of the fitting along the elongate shaft.

The present disclosure also relates to a harness system for an amusement ride that includes a passenger carriage, an elongate shaft fixedly secured at two attachment points to the passenger carriage, a fitting coupled to the elongate shaft, a harness attachment coupled to the fitting, and a harness. The fitting is freely movable in a direction parallel to a longitudinal axis of the elongate shaft between the two attachment points. The harness is fixedly coupled to the harness attachment to secure a passenger in the amusement ride.

In one embodiment, the fitting is freely movable along the elongate shaft during operation of the amusement ride. In one implementation, the fitting is resistively slidable along the elongate shaft.

In one embodiment, the elongate shaft is fixedly secured to the passenger carriage at each end of the elongate shaft.

In one embodiment, the elongate shaft is fixedly secured to the passenger carriage at a location behind the passenger.

In one implementation, the attachment points are adjustable along the elongate shaft.

In one embodiment, the passenger carriage includes a seat and the harness is attached to the seat at a first end of the harness opposite a second end attached to the attachment harness.

The present disclosure also relates to a method for securing a passenger in an amusement ride. The method includes positioning a passenger in a ride-ready position, securing a first end of a harness to a passenger carriage of an amusement ride, and securing a second end of the harness to a harness attachment. The harness attachment is coupled to a fitting freely movable along an elongate shaft. The elongate shaft is fixedly secured to the passenger carriage at two attachment points.

In one embodiment, the fitting is freely movable along the elongate shaft between the two attachment points during operation of the amusement ride.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter of the present disclosure will be readily understood, a more particular description of the subject matter will be rendered by reference to specific embodiments that are illustrated in the appended drawings. Understanding that these drawings depict only typical embodiments of the subject matter of the present disclosure and are not therefore to be considered to be limiting of its scope, the subject matter will be described and explained with additional specificity and detail through the use of the accompanying drawings, in which.

DETAILED DESCRIPTION

The subject matter of the present disclosure has been developed in response to the present state of the art in amusement rides for entertainment and diversion. Accordingly, the subject matter of the present disclosure has been developed to provide an apparatus, system, and method for securely restraining passengers in an amusement ride that overcomes many or all or some shortcomings in the prior art.

Reference throughout this specification to features, advantages, or similar language does not imply that all of the features and advantages that may be realized with the subject matter of the present disclosure should be or are in any single embodiment of the subject matter. Rather, language referring to the features and advantages is understood to mean that a specific feature, advantage, or characteristic described in connection with an embodiment is included in at least one embodiment of the subject matter of the present disclosure. Thus, discussion of the features and advantages, and similar language, throughout this specification may, but do not necessarily, refer to the same embodiment.

Similarly, reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

Figure 1:
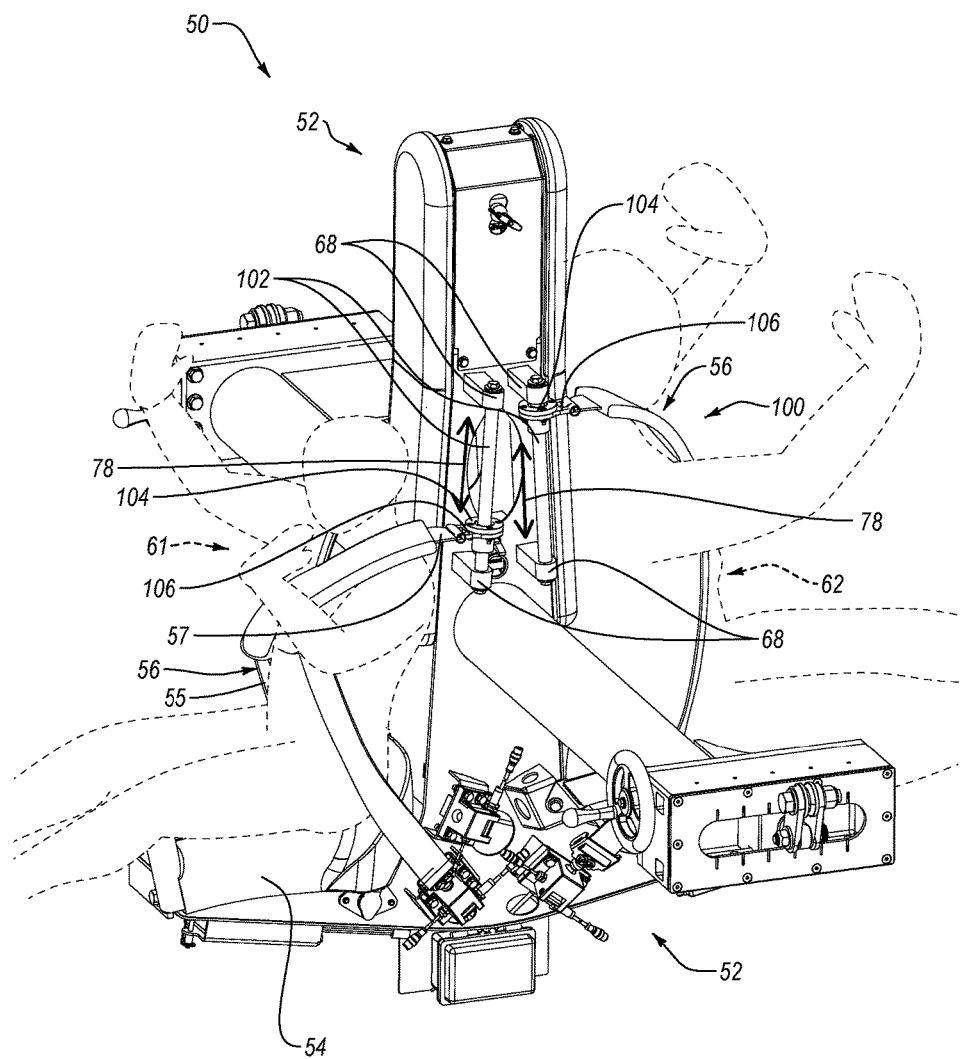
FIG. 1 is a perspective view of a harness apparatus for an amusement ride, according to one embodiment.

FIG. 1 is a perspective view of a harness apparatus 100 for an amusement ride 50, according to one embodiment. The harness apparatus 100 may be applied to any of various types of amusement rides 50. In one embodiment, the amusement ride is a swing-ride in which passengers are supported by a passenger carriage 52 while swinging through the air. For example, a support line may span a gap, such as a gorge, valley, ravine, gulch, or chasm, and the passenger carriage 52 may be coupled to the support line via a swing line. The passenger carriage 52 swings through or between the edges of the gap. In another embodiment, the amusement ride may be a zip-line ride and the passenger carriage 52 may travel down a support line, propelled by gravity, with the passengers secured to the passenger carriage 52. In another embodiment, the amusement ride 50 may be a roller coaster ride that includes one or more cars that run on or along a track.

Regardless of the type, the amusement ride 50 generally includes one or more passenger carriages 52 with one or more harness apparatuses 100 that securely and safely hold respective passengers in place during the ride experience. The harness apparatus 100 may be applied to any of various types of passenger carriages 52. In some embodiments, the passenger(s) may be held and supported by the passenger carriage 52 in a standing position or in some other position (e.g., supine, prone, etc.).

As shown in FIG. 1, in one embodiment, the passenger carriage 52 holds two passengers in a seated position on seats 54 of the passenger carriage 52. In other embodiments, however, the passenger carriage may hold a single passenger on a seat or the passenger carriage may hold more than two passengers on seats.

As described below, the harness apparatus 100 facilitates the safe and secure restraint of passengers 61, 62 in passenger carriage 52 of an amusement ride 50. Also, the harness apparatus 100 allows passengers of different sizes to safely experience the amusement ride 50 by improving the adjustability of a harness 56 of the harness apparatus 100. The harness 56 can be a flexible fabric belt or other restraining mechanism.

Since passengers vary in size (e.g., height, weight, girth, etc.), amusement rides often implement height or weight limitations in order to ensure that the harness 56 or restraint mechanism can safely secure the passengers to the passenger carriage 52 during the ride experience. The harness apparatus 100 of the present disclosure provides adjustability to the harness 56, thereby potentially expanding the height/weight range of passengers that can experience the amusement ride or generally improving the fit, comfort, safety, and/or security of the harness restraint. For example, as shown in FIG. 1, the harness apparatus 100 enables both small passengers 61 and large passengers 62 to safely experience the amusement ride 50.

Figure 2:
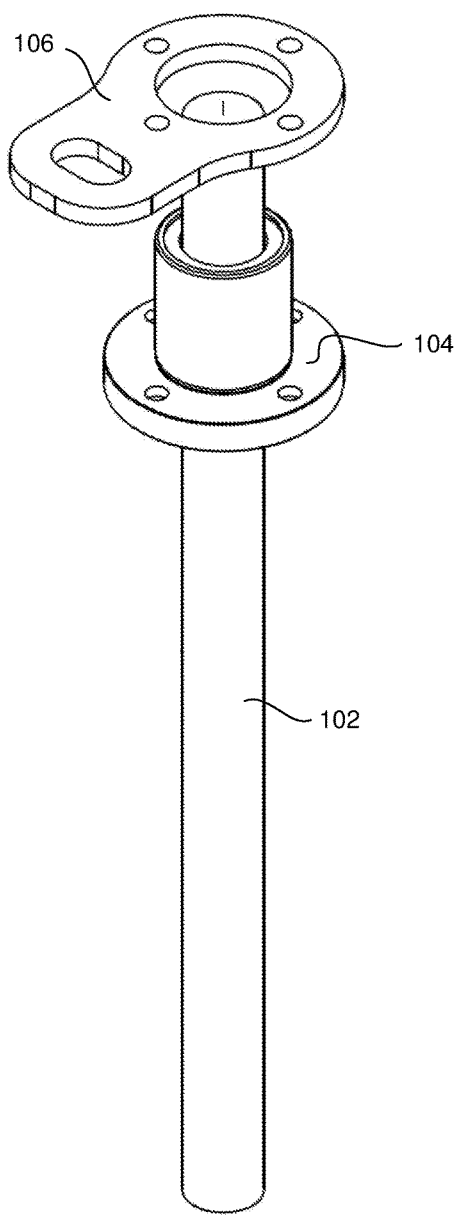
FIG. 2 is a perspective and partially exploded view of the harness apparatus of FIG. 1, according to one embodiment.
Figure 3:
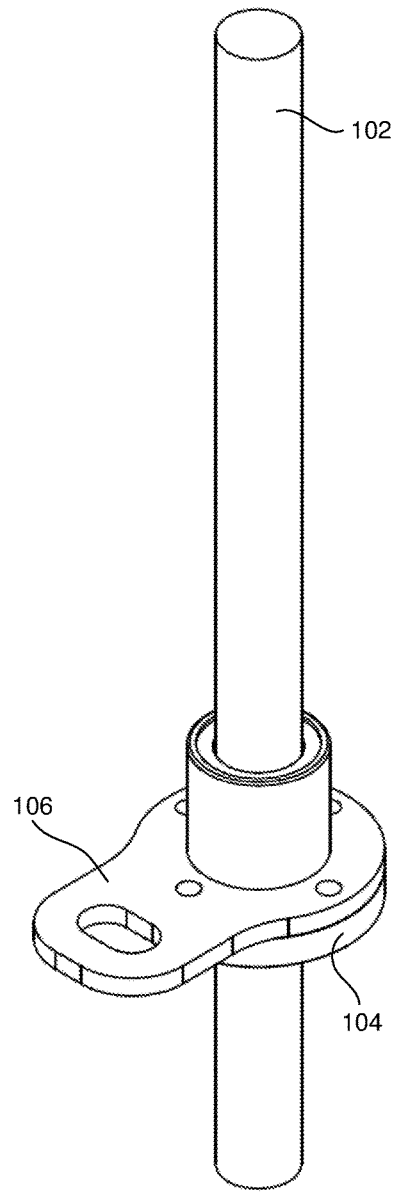
FIG. 3 is a perspective view of the harness apparatus of FIG. 1, according to one embodiment.

The harness apparatus 100, also shown in FIGS. 2 and 3, includes an elongate shaft 102, a fitting 104, secured to and movable along the elongate shaft 102, and a harness attachment 106 coupled to the fitting 104. The elongate shaft 102 is fixedly secured to the passenger carriage 52 at attachment points 68 at each end of the elongate shaft 102. The secured ends of the elongate shaft 102 restrict the fitting 104 and harness attachment 106 to positions along the elongate shaft 102 between the two secured ends of the elongate shaft 102.

In some embodiments, the attachment points 68 are along the elongate shaft. For example, the distance between the two attachment points 68 may be adjusted to lengthen or shorten the free movement of the fitting 104 along the elongate shaft 102 during operation of the amusement ride.

The harness 56 is fixedly coupled to the harness attachment 106 such that the harness attachment 106 couples the harness 56 with the fitting 104 and allows the harness 56 to move with the fitting 104 relative to the elongate shaft 102. In one embodiment, the harness attachment 106 is non-removably coupled to the harness 56. Because the fitting 104 is movable along a direction that is parallel to the longitudinal axis of the elongate shaft 104, the position of the harness attachment 106 can be adjusted to alter the position of one end of the harness 56, thereby providing a snug and/or secure fit for each passenger, despite the potential variation in size among passengers. In one embodiment, the position of the fitting 104 along the elongate shaft 102 (and thus the position of the harness attachment 106) can be adjusted according to the length of a passenger's torso. In other words, the harness 56 may be a shoulder harness and the position of the fitting 104 can be adjusted along the length of the elongate shaft 102 so that the harness 56 connects to the harness attachment 106 at a specific height relative to the shoulder of the passenger (e.g., at or below the position of the shoulder). In another embodiment, the harness apparatus 100 may be employed in conjunction with a waist harness, a leg harness, a hand harness, etc. In other words, the harness apparatus 100 may be used to help the harness securely engage/retain any of various body parts or body sections of the passenger 61, 62. As described in greater detail below, the adjustments to the position of the fitting 104 may be manual or automated.

In one embodiment, the engagement of the fitting 104 with the elongate shaft 102 is such that relative movement between the fitting 104 and the elongate shaft 102 is freely allowed while loading passengers onto or from the passenger carriage 52, but is prevented during a ride or while the passenger carriage 52 is in motion. The term "freely movable", in some embodiments, is used to describe to the ability of the fitting 104 to move relative to the elongate shaft 102 while loading and/or unloading passengers. In other words, in some embodiments, the fitting 104 is only "freely movable" before or after the ride is over and the fitting 104 is not freely movable during the actual ride itself. In other embodiments, the fitting 104 is "freely movable" before, during, and after the ride is over. Additionally, as described below, the term "freely movable" does not necessarily mean that movement of the fitting 104 relative to the elongate shaft 102 is free from resistance. For example, as described below, an interference or a resistive fit between the fitting 104 and the elongate shaft 102 may still be categorized as freely movable herein.

In one embodiment, an aperture of the fitting 104 is resistively slidable about and along the elongate shaft 102 when the passenger is boarding and/or unboarding the ride. In such an example, the cross-sectional shape of the aperture of the fitting 104 corresponds with the cross-sectional shape of the elongate shaft 102 (e.g., both cylindrical). In other words, the cross-sectional internal dimension of the aperture of the fitting 104 may be just larger than the cross-sectional outer dimension of the elongate shaft 102, thereby creating a resistive fit/engagement between the fitting 104 and the elongate shaft 102. The resistive fit between the fitting 104 and the elongate shaft 102 allows the position of the fitting 104 relative to the elongate shaft 102 to be manually and purposefully adjusted before the ride begins but also prevents the fitting 104 from inadvertently moving (e.g., slipping, sliding) along the elongate shaft 102 while the passenger is boarding.

The fitting 104 may be manually moved into a desired position directly via manual manipulation of the fitting 104 or indirectly via the process of securing and cinching down the harness 56 about the passenger's body. For example, with a first end 57 of the harness 56 fixed to the harness attachment 106 and freely movable along the elongate shaft 102, a second portion 55 (e.g., a second end) can be fixed at a second location (proximate the second portion 55), thus fixing a length of the harness 56 about the passenger's body.

In one embodiment, the second portion 55 is permanently and non-detachably fixed at the second location, thus preventing the harness from "unbuckling" like a conventional vehicle belt. In other words, while the length of the harness extending between the first end 57 and the second portion 55 may be adjustable, the harness 56 itself does not detach and does not decouple from the passenger carriage 52. Thus, during a passenger loading process, before locking the second portion 55 of the harness 56 in place, the passenger may adjust (e.g., increase) the length of the section of the harness 56 extending between the second location (e.g., the location where the second portion 55 of the harness 56 is secured) and the harness attachment 106 by seating himself on the seat 54 with one arm and his head being passed through the harness 56. The length adjustment causes the fitting 104 along the elongate shaft 102 to rise into a desired position on the shoulder of the passenger. Once the length of the section of the harness extending between the second location and the harness attachment 106 has been properly adjusted to fit around a specific passenger, the second portion 55 of the harness 56 is locked in place, thus locking (e.g., via a clamping mechanism) the length of the section of the harness 56. In some embodiments, the length of the section of the harness 56 extending between the second location (i.e., location where the second portion 55 of the harness 56 is secured) and the harness attachment 106 and the position of the fitting 104 along the elongate axis 102 are both adjustable in a passenger-loading mode and are both non-adjustable (e.g., locked) in a passenger-riding mode. In such an implementation, both the length of the section of the harness 56 extending between the second location and the harness attachment 106 and the position of the fitting 104 along the elongate axis 102 are locked by a single locking action of the second portion of the harness 56 at the second location. That is, the length of the section of the harness 56 extending between the second location and the harness attachment 106 and the position of the fitting 104 along the elongate axis 102 are not independently lockable.

During a passenger unloading process, the second portion of the harness 56 is unlocked to allow the passenger to exit the passenger carriage 52. In some embodiments, once the passenger exits the carriage 52, the fitting 104 and harness 56 slides downward along the elongate shaft 102 under the force of gravity into a position in preparation for the next passenger to initiate the loading process.

In one embodiment, the apparatus 100 includes a biasing element that biases the fitting 104 in a certain direction parallel to the longitudinal axis of the elongate shaft 102. For example, the biasing element may bias the fitting 104 in a downward direction, thus requiring the passenger or a ride attendant to manually move the fitting 104 upwards (i.e., against the bias) along the elongate shaft 102 to allow the passenger to properly orient himself or herself. With the passenger oriented, the harness 56 may be positioned around the body or body part of the passenger as the biasing element biases the fitting 104 towards the body or body part of the passenger. The harness 56 may then be locked into place (e.g., fixing the length of the section of the harness 56 traversing the body or body part of the passenger), thereby simultaneously preventing movement of the fitting 104 along the elongate shaft 102.

In some embodiments, the fitting 104 is "freely movable" during operation of the amusement ride. During operation of the amusement ride means while the passenger carriage 52 is in motion and the amusement ride is functioning between loading and unloading of passengers 61, 62. The free motion of the fitting 104 along the elongate shaft 102 allows one end on the harness to move along elongate shaft 102 while keeping the harness 56 secured to the passenger carriage 52. The free motion is represented by arrows 78 in FIG. 1 to show the movement of the fitting 104 and the harness attachment 106 along the elongate shaft 102 between the two attachment points 68. The passenger 61 may feel the sensation and excitement of being unsecured but remain secured to the passenger carriage 52. The elongate shaft 102 is fixedly secured to the passenger carriage 52 at each end of the elongate shaft 102 but the fitting 104 and the harness attachment 106 may slide back and forth along the elongate shaft 102 during the ride to bring the passenger a sensation of moving relative to the passenger carriage 52. The length of the harness 56 may, in some embodiments, be a fixed length but the positioning of the harness attachment 106 and fitting 104 may move relative to the other end of the harness and the second portion 55 of the harness 56.

In one embodiment, the elongate shaft 102 is any elongate member to which the fitting 104 can be secured. In one embodiment, the elongate shaft 102 may be a rail or a track and the fitting 104 may include wheels, rollers, bearings, etc. that engage the rail or track and enable relative movement between the fitting 104 and the elongate shaft 102.

In another embodiment, the harness apparatus 100 includes a locking mechanism that is configured to lock a length of the harness 56 such that the length of the harness between the harness attachment and the second end is fixed. In another embodiment, the harness apparatus 100 includes a linear actuator that powers the motion of the fitting 104 along the elongate shaft 102. In other embodiments, multiple shafts may be incorporated to guide the movement of the fitting, one or more of which may be powered by a motor to create the linear motion.

Figure 4:
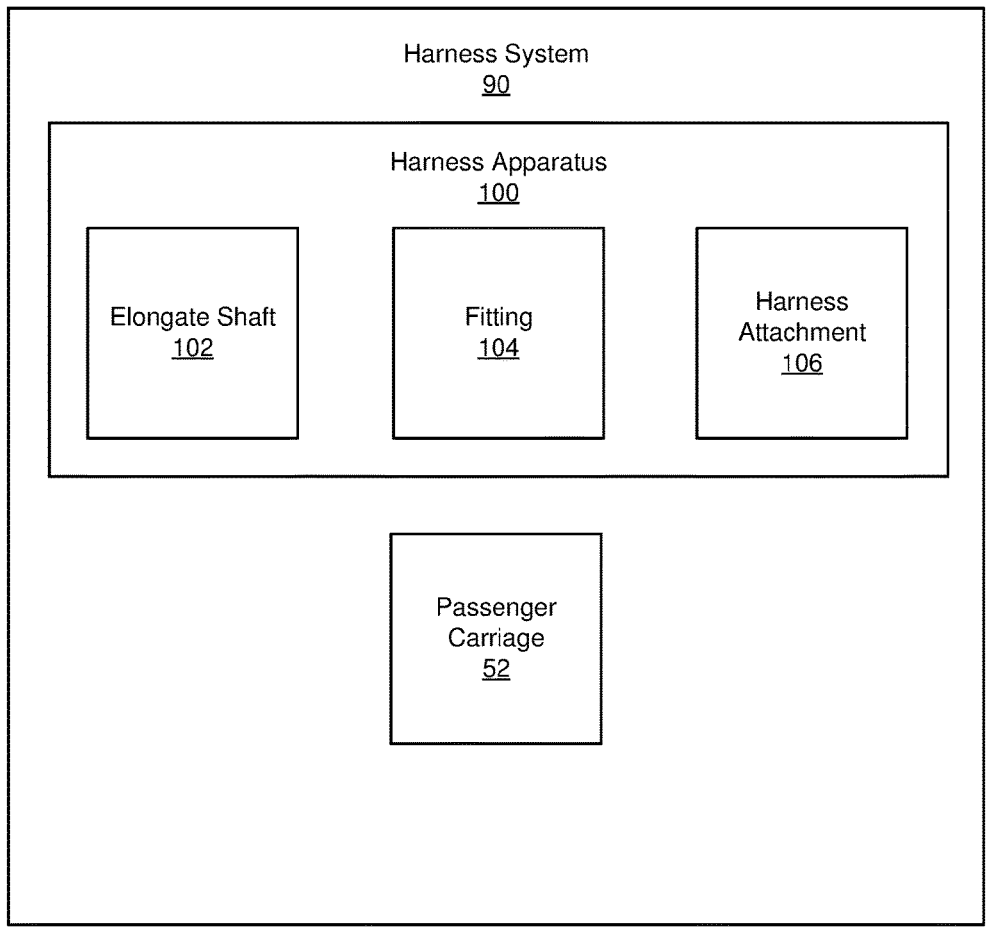
FIG. 4 is a schematic block diagram of a harness system for an amusement ride, according to one embodiment.

FIG. 4 is a schematic block diagram of a harness system 90 for an amusement ride, according to one embodiment. The harness system includes the harness apparatus 100 (which includes the elongate shaft 102, the fitting 104, and the harness attachment 106), and a passenger carriage 52. The harness apparatus 100 has been described above with reference to FIGS. 1-3.

In one embodiment, the passenger carriage 52 includes a seat 54. In some embodiments, the seat is configured to move relative to the passenger carriage and with the motion of the fitting 104. In one embodiment, the harness is attached to the seat at a first end of the harness opposite a second end attached to the attachment harness.

In some embodiments, the system further includes a biasing element configured to bias the fitting in a direction along the elongate shaft, wherein the biasing element is configured to bias the fitting towards the seat.

Figure 5:
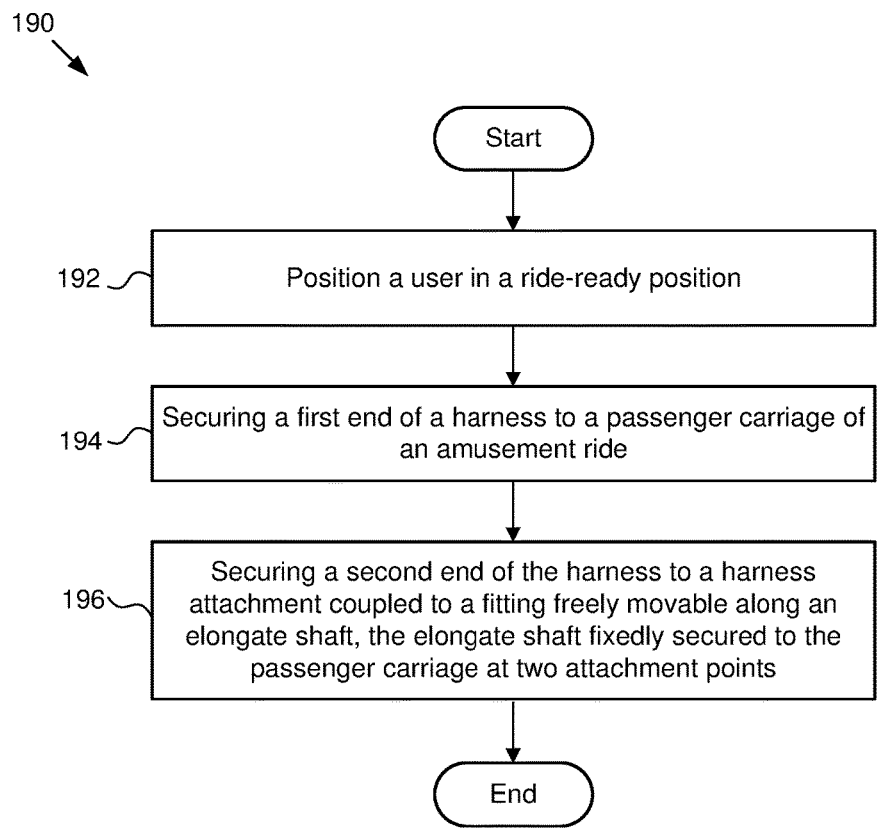
FIG. 5 is a schematic flow chart diagram of a method for securing the passenger in the amusement ride, according to one embodiment.

FIG. 5 is a schematic flow chart diagram of a method 190 for securing the passenger in the amusement ride, according to one embodiment. The method 190 includes positioning a passenger in a ride-ready position at 192 and securing a first end of a harness to a passenger carriage of an amusement ride at 194. The method 190 further includes securing a second end of the harness to a harness attachment coupled to a fitting freely movable along an elongate shaft at 196. The elongate shaft is fixedly secured to the passenger carriage at two attachment points and the fitting is freely movable along the elongate shaft between the two attachment points.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C; or some other suitable combination. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Aspects of the embodiments may be described above with reference to schematic flowchart diagrams and/or schematic block diagrams of methods, apparatuses, and systems according to embodiments of the disclosure. The schematic flowchart diagrams and/or schematic block diagrams in the figures illustrate the architecture, functionality, and operation of possible implementations of apparatuses, and systems according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A harness apparatus for an amusement ride, the harness apparatus comprising:
    an elongate shaft fixedly secured at two attachment points to a passenger carriage;
    a fitting coupled to the elongate shaft, wherein the fitting is freely movable along the elongate shaft between the two attachment points;
    a harness attachment coupled to the fitting; and
    a harness comprising a first end and a second end, wherein the first end of the harness is fixedly coupled to the harness attachment to secure a passenger in the amusement ride, and wherein the second end is fixedly secured to the passenger carriage.

2. The apparatus of claim 1, wherein the fitting is resistively slidable along the elongate shaft.

3. The apparatus of claim 1, wherein the fitting is freely movable along the elongate shaft during operation of the amusement ride.

4. The apparatus of claim 1, wherein a length of the harness is lockable to fix the length of the harness between the harness attachment and the second end.

5. The apparatus of claim 1, wherein the attachment points are adjustable along a length of the elongate shaft.

6. The apparatus of claim 1, further comprising a biasing element configured to bias the fitting in a direction along the elongate shaft.

7. The apparatus of claim 1, further comprising a biasing element configured to bias the fitting in a direction along the elongate shaft towards a seat of the passenger carriage.

8. A harness system for an amusement ride, the harness system comprising:
    a passenger carriage;
    an elongate shaft fixedly secured at two attachment points to the passenger carriage;
    a fitting secured to the elongate shaft, wherein the fitting is freely movable in a direction parallel to a longitudinal axis of the elongate shaft between the two attachment points;
    a harness; and
    a harness attachment coupled to the fitting, wherein the harness is coupleable to the harness attachment to secure a passenger in the amusement ride;
    wherein:
        the elongate shaft is fixedly secured to the passenger carriage at each end of the elongate shaft;
        the passenger carriage comprises a seat; and
        the harness is attached to the seat at a first end of the harness opposite a second end attached to the harness attachment.

9. The system of claim 8, wherein the fitting is freely movable along the elongate shaft during operation of the amusement ride.

10. The system of claim 8, wherein the fitting is resistively slidable along the elongate shaft.

11. The system of claim 8, wherein the elongate shaft is fixedly secured to the passenger carriage at a location behind the passenger.

12. The system of claim 8, wherein the attachment points are adjustable along the elongate shaft.

13. The system of claim 8, further comprising a biasing element configured to bias the fitting in a direction along the elongate shaft, wherein the biasing element is configured to bias the fitting towards the seat.

14. The system of claim 8, wherein the seat is configured to move relative to the passenger carriage.

15. A method for securing a passenger in an amusement ride, the method comprising:
    positioning a passenger in a ride-ready position;
    securing a first end of a harness to a passenger carriage of an amusement ride; and
    securing a second end of the harness to a harness attachment, the harness attachment coupled to a fitting freely movable along an elongate shaft, wherein the elongate shaft is fixedly secured to the passenger carriage, the elongate shaft fixedly secured at two attachment points.

16. The method of claim 15, wherein the fitting is freely movable along the elongate shaft between the two attachment points during operation of the amusement ride.

17. The method of claim 15, wherein the fitting is resistively slidable along the elongate shaft.

18. The method of claim 15, further comprising moving the attachment points along the elongate shaft.

\* \* \* \* \*